United States Patent [19]

Damiano et al.

[11] Patent Number: 5,284,808
[45] Date of Patent: Feb. 8, 1994

[54] DRY REFRACTORY COMPOSITION

[75] Inventors: John Damiano; Julie A. Dody (nee Hebron), both of Easton, Pa.; Wilfred A. Martinez, Annandale, N.J.

[73] Assignee: Minteq International Inc., New York, N.Y.

[21] Appl. No.: 878,142

[22] Filed: May 4, 1992

Related U.S. Application Data

[63] Continuation-in-part of Ser. No. 523,095, May 14, 1990, abandoned.

[51] Int. Cl.$^5$ .............................................. C04B 35/02
[52] U.S. Cl. ...................................... 501/103; 501/110; 501/111; 501/128; 501/133; 501/104; 501/105
[58] Field of Search ............... 501/94, 99, 108, 109, 501/110, 111, 127, 128, 133, 103, 104, 105, 123, 153, 154

[56] References Cited

U.S. PATENT DOCUMENTS

| | | | |
|---|---|---|---|
| 4,508,835 | 4/1985 | Kaniuk et al. | 501/133 |
| 4,618,079 | 10/1986 | Barnes et al. | 501/95 |
| 4,623,131 | 11/1986 | Roberts | 501/107 |

FOREIGN PATENT DOCUMENTS

| | | | |
|---|---|---|---|
| 0035068 | 2/1984 | Japan | 501/110 |

*Primary Examiner*—Mark L. Bell
*Assistant Examiner*—Paul Marcantoni
*Attorney, Agent, or Firm*—Edward J. Whitfield

[57] ABSTRACT

A refractory composition, particularly for application as a dry vibratable refractory for forming the wearable, disposable monolithic lining coating the permanent lining of a tundish or ladle used in molten metal casting processes is disclosed. The composition contains a refractory aggregate, a first bonding agent actuatable at temperatures in the range of from about 300° F. to about 1000° F. to cause the formation of interparticle bonds between aggregate particles, at least one second bonding agent actuatable at temperatures in the range of from about 1000° F. to about 2500° F. to cause further formation of interparticle bonds between aggregate particles, and, optionally, clay. The use of both first and second bonding agents enables installation of the refractory in hot practice, in which vessel preheat temperatures of up to about 2500° F. are utilized.

15 Claims, No Drawings

DRY REFRACTORY COMPOSITION

This application is a continuation-in-part of application Ser. No. 07/523,095, filed May 14, 1990, now abandoned.

FIELD OF THE INVENTION

This invention relates to refractory compositions, particularly those which are installed without the need for water. The invention further relates to refractory compositions which are useful for forming the wearable, disposable monolithic lining which coats the permanent lining of either a tundish used in continuous molten metal casting processes or a ladle used in molten metal casting processes. The invention still further relates to refractory compositions which can be applied dry either with or without the aid of vibration.

BACKGROUND OF THE INVENTION

A tundish is a large intermediate holding vessel for molten metal used in continuous casting processes, such as the continuous casting of steel. The tundish is, in effect, an intermediate process reservoir which receives a large quantity of molten metal from conveying ladles exiting a furnace in which actual smelting of the ores or refining of molten metal occurs, and which then transfers the molten metal to a casting system. A system of inlet and outlet nozzles controls the flow of molten metal into and out of the tundish.

The tundish itself is generally a steel vessel which is lined with several layers of a refractory composition. A permanent lining, generally of refractory brick, serves as an inner lining to protect the vessel. The permanent lining, in turn, is coated with a wearable and disposable lining, generally of a refractory composition which has been applied to the permanent lining by gunning, spraying, trowelling, or dry vibration. The disposable lining is in direct contact with the molten metal in the tundish and protects the permanent lining from exposure to the molten metal.

In general, there are two types of monolithic refractory compositions which are used as disposable tundish linings, those which require the addition of a liquid phase, usually water, in order to apply the composition to the permanent lining and those which do not require a liquid phase for the application of the composition to the permanent lining. Those compositions which require a liquid are applied by either gunning, spraying, or trowelling. Those compositions which do not require a liquid are called "dry vibratables".

A dry vibratable is generallly installed by one of two methods, one which uses a former to control the application thickness and the other which does not require the use of a former. The former is shaped to the contour of the inner dimensions of the vessel. This method allows for the even application of a desired thickness of monolithic refractory (dry vibratable) in large or complex vessels. The method for application which does not require a former, namely, the so called "no-former" method, involves preheating the vessel from about 1200° F. to about 2000° F. once preheated, the vessel is completely filled with the dry monolithic refractory. The refractory is allowed to cure in the vessel for about 1–5 minutes. After this time has elapsed, a working lining of finite thickness is formed and the uncured refractory is reclaimed for reuse. This method allows the control of application thickness by time allowed for curing. This method is useful for lining small or uncomplicated vessels.

In the continuous casting process of steelmaking, there are two general tundish practices, cold practice and hot practice. Cold practice means that the tundish is at ambient temperature when steel is conveyed from the ladle into the tundish. Hot practice involves preheating the tundish to temperatures ranging from about 1200° F. to about 2500° F. Thus, the steel is conveyed from the ladle to a "hot" tundish. The use of hot practice in steelmaking has resulted in higher quality steel being produced from the continuous casting process. The higher quality from the hot practice has been related to, among other things, reduced chilling effects, reduced gas evolution and reduced turbulence in the preheated tundish due to reduced gas evolution from the preheated refractory lining.

Traditionally, only the gunnable, sprayable, or trowellable monolithic refractories have been used as disposable linings for hot practice tundishes. Dry vibratable refractories were not used in this application because their bonding system was not sufficient at preheat temperatures. The traditional dry vibratable bond system is comprised of two parts, a low temperature bonding agent, is usually an organic resin, and a high temperature bond system, usually a silicate. In order to facilitate preheating, an intermediate temperature bonding agent was needed. This has been accomplished in the present invention by replacing the silicate with either a phosphate or silicate/metal powder bonding system which gives the refractory the necessary strength at both intermediate and high temperatures. The strength at these temperatures is necessary to ensure that the dry vibratable monolithic refractory remains in place to act as the tundish working lining.

SUMMARY OF THE INVENTION

We have discovered that the properties of a refractory material suitable for use as the material of a disposable lining for a tundish are significantly improved in a composition wherein the principal component is a refractory aggregate such as magnesia, alumina, calcia, silica or combinations of the above materials, together with from about 1.0 to about 5.0 weight percent of a low temperature bonding agent such as a phenolic resin, and from about 0.0 to about 5.0 weight percent clay, by the addition of an intermediate bonding agent comprised of either a phosphate, monosodium phosphate or sodium hexametaphosphate, or a combination of an alkali metal silicate and a metal powder in a 1:1 weight ratio, such as anhydrous sodium silicate and ferrosilicon metal alloy powders. Refractory compositions prepared according to the present invention have been found to have excellent preheat capabilities. The material is applied as a dry vibratable. When applied as a protective lining to a tundish on top of the permanent lining, materials of the present invention demonstrate excellent strength at preheat temperatures (1200° F.–2500° F.) which enhances steel quality by virtue of the increased lining temperature and reduces chilling effects on molten steel poured into the tundish. Moreover, since the materials of the present invention require no water for application, the risk of steam explosions in the tundish is eliminated. The present material also exhibits excellent deskullability properties which reduces the turn-around time for reuse of the tundish. The present material has a high durability and causes little or no marring of the tundish permanent lining surface to which it is applied.

DETAILED DESCRIPTION OF THE INVENTION

In accordance with the present invention, a dry vibratable refractory composition for use as a disposable liner for a tundish or the like includes, as a principal component, a refractory aggregate material selected from the group consisting of magnesia, alumina, calcia, silica, zirconia and combinations thereof; from about 1.0 to about 5.0 weight percent of an organic resin as a low temperature bonding agent, in particular a phenolic resin; from about 0.5 to about 10.0 weight percent of at least one intermediate temperatue bonding agent comprised of either a phosphate, in particular, a sodium phosphate containing less than 40.0 weight percent soda, or monoammonium phosphate; or a combination of an alkali metal silicate and a metal alloy powder, preferably in a 1:1 weight ratio. In the latter such combination, the silicate is selected from the group consisting of anhydrous sodium silicate and hydrated sodium silicate, and the metal is selected from the group consisting of a ferrosilicon, preferably having an iron content of from about 20.0 to about 30.0 weight percent and a silicon content of from about 80.0 to about 70.0 weight percent, and most preferably an iron content of 25.0 weight percent and a silicon content of 75.0 weight percent; aluminum/silicon alloy, preferably having an aluminum content of from about 70.0 to about 90.0 weight percent and a silicon content of from about 30.0 to about 10.0 weight percent, and most preferably an aluminum content of 80.0 weight percent and a silicon content of 20.0 weight percent; and magnesium-/aluminum alloy, preferably having a magnesium content of from about 40.0 to about 60.0 weight percent and an aluminum content of from about 60.0 to about 40.0 weight percent, and most preferably a magnesium content of 50.0 weight percent and an aluminum content of 50.0 weight percent; and from about 0.0 to about 5.0 weight percent clay selected from the group consisting of ball clay, kaolin clay, bentonite and mixtures thereof, to enhance surface quality. The balance of the composition, adding to 100.0 weight percent, is the refractory aggregate base material.

The metal alloy powders are most effective when they have a particle size in the range of from about 1 to about 500 microns.

The preferred phenolic resin low temperature bonding agents in the compositions of the present invention are phenol formaldehyde polymers having a hexamine content of from about 1.0 to about 10.0 weight percent, and an average molecular weight of from about 4,000 to 10,000 a.m.u.

The overall range of refractory compositions encompassed by this invention is:

| Component | Weight Percent |
| --- | --- |
| Refractory Material | Balance |
| Low Temperature Bonding Agent | 1.0–5.0 |
| Intermediate Temperature Bonding Agent | 0.5–10.0 |
| Clay | 0.0–5.0 |

In order to be able to preheat the composition described, it has been found that the intermediate temperature bond agent must be present in the composition in the proper amount. The presence of this additive supplies strength to the refractory lining after the low temperature bond agent has lost its strength enhancing capabilities at higher temperatures. The intermediate bond agent forms interparticle bonds at temperatures lower than the usual preheat temperatures. This results in a strong material at the preheat temperatures which will retain its shape and position to afford protection to the permanent lining. It has been found that without the addition of the intermediate bond agent the refractory crumbles and spalls when exposed to preheat temperatures. This spalling is caused by a lack of sufficient intermolecular bonds in the refractory at the preheat temperatures.

It has been found that the addition of about 0.0 to about 5.0 weight percent of clay enhances the surface quality of the cured refractory lining and aids in increasing the intermediate temperature bond strength. The surface quality aspect is predominantly an aesthetic effect and is not greatly reduced if the clay is not added. It has been found that if a sufficient quantity of the intermediate temperature bond agent is supplied to the composition, the clay can be omitted without detracting from the preheat strength of the composition.

The refractory compositions of the present invention have been found to be highly effective for appliction as a monolithic lining to the inner surface of a vessel such as a tundish or a ladle used in molten metal casting processes, especially steelmaking, in hot practice, by utilizing a dry method which comprises the steps of placing a cast-forming device for form shaping a dry refractory composition into a vessel in such a way as to leave a gap between the vessel and the cast-forming device; pouring into the gap an amount of a refractory composition sufficient to cover the inner surfaces of the vessel; the refractory composition containing from about 1.0 to about 5.0 weight of a low temperature bonding agent; from 0.5 to about 10.0 weight percent of at least one intermediate temperature bonding agent; and from 0.0 to about 5.0 weight percent clay; with the balance totaling 100 weight percent being a refractory aggregate material; curing the refractory composition by raising the temperature in the vessel from about 300° F. to about 1000° F. to cause interparticle bond formation between particles of the refractory aggregate initiated by the low temperature bonding agent; removing the cast-forming device to leave a monolithic casting of the refractory material on the inner surface of the vessel; and preheating the refractory composition by is raising the temperature in the vessel from about 1000° F. to about 2500° F. to further cause interparticle bond formation between particles of the refractory aggregate initiated by the intermediate temperature bonding agent.

EXAMPLES

The present invention can be more fully understood in light of the following non-limiting examples.

Refractory compositions according to the present invention were prepared utilizing the following materials:

Refractory—Dead burned magnesia (MgO);
Low temperature bond agent—phenolic resin;
Intermediate temperature bond—Type #1, a phosphate of a composition which contains less than 40.0 weight percent sodium oxide; and type #2, a combination of an alkali metal silicate and a powdered metal alloy present in a 1:1 weight ratio;
Clay—air floated ball clay.

EXAMPLE 1

Preparation of Samples—Curing

The ingredients were first dry mixed thoroughly in a planetary paddle type electric mixer for from 1–5 minutes. The mixture was poured into a steel mold to make standard 7"×1"×1" bars. The bars were leveled to produce a smooth surface. The bars are heated to 350° F. for 90 minutes.

EXAMPLE 2

Example Formulations

Example 2
Example Formulations

| Component | Weight Percent | | |
|---|---|---|---|
| | IA | IIA | IIIA |
| Magnesia/Silica/Alumina | Balance | Balance | Balance |
| Air Floated Ball Clay | 1.0 | 1.0 | 0.0 |
| Phenolic Resin | 3.0 | 4.0 | 2.5 |
| Monosodium Phosphate | 2.5 | — | — |
| Sodium Hexametaphosphate | — | 2.0 | — |
| Monoammonium Phosphate | — | — | 6.0 |

All compositions prepared according to method in Example 1.

EXAMPLE 3

Example Formulations

Example 3
Example Formulations

| Component | Weight Percent | | |
|---|---|---|---|
| | IB | IIB | IIIB |
| Magnesia/Silica/Alumina | Balance | Balance | Balance |
| Air Floated Ball Clay | 1.0 | 0.0 | 2.0 |
| Phenolic Resin | 3.0 | 3.0 | 4.0 |
| Anhydrous Sodium Silicate | 1.5 | — | 2.0 |
| Hydrated Sodium Silicate | — | 2.0 | — |
| Ferrosilicon powder, −150 mesh | 1.5 | — | — |
| Aluminum/Silicon powder | — | 2.0 | 2.0 |

All compositions prepared according to method in Example 1.

EXAMPLE 4

Laboratory Evaluation of Refractory Compositions for Strength at Preheat Temperatures The samples prepared according to Example 1 were cut into thirds lengthwise. These samples were fired to either 1000° F., 1500° F., or 2000° F. and soaked at temperature for 1 hour. At the end of the soak period, the samples were abraded with a metal rod and qualitatively rated for strength. A rating scale was established as follows:

| Rating | Criteria |
|---|---|
| 0 | Sample does not retain shape at temperature |
| 1 | Sample retains shape but crumbles upon Abrasion |
| 2 | Abrasion results in ¼" deep cut in sample |
| 3 | Abrasion results in ¼" deep cut in sample |
| 4 | Abrasion results in ¼" deep cut in sample |
| 5 | Abrasion does not leave cut in sample |

Ratings of 3, 4 and 5 are judged as viable compositions for application in tundish.

EXAMPLE 5

Compositions from Examples 2 and 3 were tested according to the procedure in Example 4. Results are shown in Table 1.

TABLE 1

| Composition | 1000° F. | Rating | |
|---|---|---|---|
| | | 1500° F. | 2000° F. |
| IA | 3 | 4 | 5 |
| IIA | 2.5 | 3 | 4 |
| IIIA | 3 | 4 | 4 |
| IB | 3.5 | 4 | 5 |
| IIB | 3 | 3.5 | 4 |
| IIIB | 3.5 | 4 | 4.5 |

EXAMPLE 6

Field Evaluation of Composition IA

Composition IA was evaluated in actual tundish application. Preheat temperature was from about 2100° F. to about 2600° F. Composition IA was sequenced on continuous caster. Material deskulled cleanly and easily. No damage or marring of the permanent lining of the tundish occurred.

EXAMPLE 7

Field Evaluation of Composition IIA

Composition IIA was evaluated in actual tundish application. Preheat temperature was from about 1500° F. to about 1800° F. Composition IIA survived preheat and was sequenced on continuous caster. The material deskulled cleanly and easily. The tundish permanent lining showed no signs of wear.

EXAMPLE 8

Field Evaluation of Composition IIIA

Composition IIIA was evaluated as disposable ladle lining in a foundry casting ladle. The material was installed using a no-former method. The material installation was successful and the ladle was preheated to about 2500° F. Five heats of steel were cast through the ladle. The lining deskulled cleanly and easily. The castings showed a reduced non-metallic inclusion count as compared to castings which were made from a ladle that was not lined with a refractory lining of composition IIIA.

EXAMPLE 8

Field Evaluation of Composition IIIA

Composition IIIA was evaluated as disposable ladle lining in a foundry casting ladle. The material was installed using a no-former method. The material installation was successful and the ladle was preheated to about 2500° F. Five heats of steel were cast through the ladle. The lining deskulled cleanly and easily. The castings showed a reduced non-metallic inclusion count as compared to castings which were made from a ladle that was not lined with a refractory lining of composition IIIA.

As used in the specification and claims herein, the terms "first bonding agent" and "low temperature bonding agent" are used interchangeably and refer to a bonding agent that is actuatable to cause the formation of interparticle bonds between refractory aggregate particles at temperatures in the range of from about 300° F. to about 1000° F.; and the terms "second bonding agent" and "intermediate temperature bonding agent" are used interchangeably and refer to a bonding agent that is actuatable to cause the further formation of interparticle bonds between refractory aggregate particles at temperatures in the range of from about 1000° F. to about 2500° F.

We claim:

1. A refractory composition for forming a monolithic refractory in a dry state at a temperature of up to about 2500° F. comprising:
   a refractory aggregate material selected from the group consisting of magnesia, alumina, calcia, silica, ziconia and mixtures thereof;
   from about 1.0 to about 5.0 weight percent of a first bonding agent, actuatable at temperatures in a first range of from about 300° F. to about 1000° F. to cause interparticle bond formation between particles of said refractory aggregate, at temperatures in said first range wherein said first bonding agent is a phenolic resin;
   from about 0.5 to about 10.0 weight percent of at least one second bonding agent actuatable at temperatures in a second range of from about 1000° F. to cause further interparticle bond formation between particles of said refractory aggregate, at temperatures in said second range wherein said second bonding agent is selected from the group consisting of a phosphate-containing compound having a sodium content of less than about 40.0 weight percent, and a mixture of an alkali metal silicate compound and a metal alloy powder wherein the alkali metal silicate and the metal alloy powder are present in a weight ratio of about 1.1; and
   from about 0 to about 5.0 weight percent of a clay;
      such that the balance of said composition to total 100.0 weight percent is said refractory aggregate material.

2. The refractory composition according to claim 1 wherein said phenolic resin is a phenol-formaldehyde polymer.

3. The refractory composition according to claim 1 wherein the phosphate-containing compound is selected from the group consisting of monosodium phosphate, sodium hexametaphosphate, and monoammonium phosphate.

4. The refractory composition according to claim 1 wherein the alkali metal silicate is selected from the group consisting of anhydrous sodium silicate and hydrated sodium silicate.

5. The refractory composition according to claim 1 wherein the metal alloy powder is selected from the group consisting of:
   iron-silicon alloy having an iron content of from about 20 to about 30 weight percent of the alloy and a silicon content of from about 80 to about 70 weight percent of the alloy;
   aluminum-silicon alloy having an aluminum content of from about 70 to about 90 weight percent of the alloy and a silicon content of from about 30 to about 10 weight percent of the alloy; and
   magnesium-aluminum alloy having a magnesium content of from about 40 to about 60 weight percent of the alloy and an aluminum content of from about 60 to about 40 weight percent of the alloy.

6. The refractory composition according to claim 1 wherein the metal alloy powder has an average particle size in the range of from about 1 micron to about 400 microns.

7. The refractory composition according to claim 2 wherein the phenol-formaldehyde polymer has a hexamine content of from about 1.0 to about 10.0 weight percent of the polymer and an average molecular weight of from about 4,000 to about 10,000 a.m.u.

8. The refractory composition according to claim 3 wherein the phosphate-containing compound is monosodium phosphate.

9. The refractory composition according to claim 4 wherein the alkali-metal silicate is anhydrous sodium silicate.

10. The refractory composition according to claim 5 wherein the metal alloy powder is iron-silicon alloy and has an iron content of 25 weight percent of the alloy and a silicon content of 75 weight percent of the alloy.

11. The refractory composition according to claim 5 wherein the metal alloy powder is aluminum-silicon alloy and has an aluminum content of 80 weight percent of the alloy and a silicon content of 20 weight percent of the alloy.

12. The refractory composition according to claim 5 wherein the metal alloy powder is magnesium-aluminum alloy and has a magnesium content of 50 weight percent of the alloy and an aluminum content of 50 weight percent of the alloy.

13. The refractory composition according to claim 1 wherein the clay is selected from the group consisting of ball clay, kaolin clay, bentonite and mixtures thereof.

14. The refractory composition according to claim 1 which is vibratable.

15. A refractory composition for application as a dry refractory comprising:
   from about 2.5 to about 3.5 weight percent phenol formaldehyde;
   from about 2.5 to about 3.5 weight percent monosodium phosphate;
   from about 2.5 to about 3.5 weight percent of a mixture of anhydrous sodium silicate and an iron-silicon metal alloy powder with an average particle size in the range of from about 1 micron to about 400 microns, said silicate and said powder being in a 1:1 weight ratio; and from 0.0 to about 5.0 weight percent of a clay.

* * * * *